United States Patent

Zaretsky et al.

Patent Number: 6,052,265
Date of Patent: Apr. 18, 2000

[54] INTELLIGENT GROUND FAULT CIRCUIT INTERRUPTER EMPLOYING MISWIRING DETECTION AND USER TESTING

[75] Inventors: Albert Zaretsky, Boynton Beach, Fla.; Roger M. Bradley, North Belmore, N.Y.

[73] Assignee: Leviton Manufacturing Co., Inc., Little Neck, N.Y.

[21] Appl. No.: 09/197,192

[22] Filed: Nov. 20, 1998

[51] Int. Cl.[7] .................................................. H02H 7/04
[52] U.S. Cl. ................. 361/42; 361/45; 340/638
[58] Field of Search .................. 361/42, 45, 46, 361/78, 87, 93.4; 340/635, 638, 650, 654, 664

[56] References Cited

U.S. PATENT DOCUMENTS 5,477,412   12/1995   Neiger et al. ............................ 361/45
5,600,524    2/1997   Neiger et al. ............................ 361/42

*Primary Examiner*—Michael J. Sherry
*Attorney, Agent, or Firm*—Paul J. Sutton

[57] ABSTRACT

An intelligent ground fault circuit interrupter device that incorporates a test and miswiring control circuit in addition to an independent GFCI circuit. Since the test and miswiring circuit is separate and independent of the GFCI circuit portion, it can be used with any circuit interrupting means that can be reset and which incorporates a test circuit. The test and miswiring circuit functions to indicate to a user when the device must be manually tested. The test time events occur upon first installation and on a monthly basis thereafter. The device also indicates that testing is required after occasions of power outage of sufficient time duration and after the device has been tripped by the occurrence of a ground fault. At the times when manual testing of the device is required, a visual and/or audible alarm is triggered and continues until a successful test and reset sequence is completed. The ability to detect when the device is incorrectly wired in an electrical wiring system is also provided. Upon detection of a miswiring condition, a visual and/or audible alarm is triggered to alert the user to the miswired condition. The alarm cannot be disabled unless the miswiring condition is removed.

18 Claims, 11 Drawing Sheets

INTELLIGENT GROUND FAULT CIRCUIT INTERRUPTER EMPLOYING MISWIRING DETECTION AND USER TESTING

FIELD OF THE INVENTION

The present invention relates generally to the field of ground fault circuit interrupters (GFCIs) and more particularly to an intelligent ground fault circuit interrupter employing miswiring detection and the means for user testing of the device.

BACKGROUND OF THE INVENTION

Ground fault circuit interrupters (GFCIs) were developed to meet a pressing need for a device that was capable of detecting abnormal current flow (typically current flow from phase to ground) and in response thereto, interrupting power to the electrical system to which the device is connected. In such a manner, the device would help protect people from electric shock, fire and explosion. To provide a high degree of protection, the detection of ground fault current in the order of milliamps is required, while the load current flowing may range from 10 to 100 A.

While numerous prior art techniques are available for protecting against ground faults, two issues remain in the application of GFCIs in residential and commercial environments. Firstly the correct installation of the GFCI and secondly the reliability of the GFCI once installed.

When a ground fault is detected, a GFCI will interrupt both phase and neutral electrical lines. Thus, users are protected from phase to ground faults even if the phase and neutral wires have been inadvertently switched. Miswiring a GFCI device, however, can still be problematic. Receptacle, i.e., wall outlet, GFCIs can be wired to protect a single outlet, or they can be wired as a 'through' device protecting not only the GFCI outlet itself but also outlets downstream from the device.

In addition, GFCIs are typically installed into the electrical system prior to electricity being applied, especially in new construction. Wiring a receptacle using the 'through' arrangement carries with it the possibility of miswiring, since the wiring box contains two pairs of phase and neutral wires which are not always easily identifiable as line and load. Consequently, there is a real possibility that an installer might inadvertently connect the line side of the AC wiring to the load side of the GFCI and the load side of the AC wiring to the line side of the GFCI. While in this line/load reverse wiring condition, downstream electrical devices are still protected but any receptacles in the GFCI device itself are not protected, thus creating a potential hazard.

Currently, GFCIs are shipped with warning labels and detailed installation instructions, but these are not always read by installers and/or end users. Thus, there is a need for a means to determine when a line/load reverse wiring condition exists.

In addressing problems of reliability, it is noted that typically, a GFCI is connected to the premise electrical wiring system at the time of installation and is forgotten thereafter. The homeowner or contractor simply assumes that the GFCI they just installed will operate correctly years after it is installed. Unfortunately, this is not necessarily the case. Despite the efforts of manufacturers, GFCIs are still subject to a number of failure modes. These failure modes are typically caused by abnormal operating conditions such as poor AC supply quality, misuse or chemical action upon the internal parts of the GFCI.

To ensure reliability, many GFCI devices incorporate a TEST button that is located on the exterior of the device that when pressed, simulates a ground fault. This simulated ground fault causes the internal circuitry to respond as if a real ground fault had occurred. The majority of the internal components, circuitry and mechanical mechanisms are exercised and tested. If the internal mechanisms of the GFCI are working correctly, the contacts internal to the GFCI open thus removing power from the electrical circuit connected to the GFCI.

Following a test, the GFCI must be reset in order to return to its normal operating condition. This is typically achieved by pressing a RESET button also located on the exterior of the GFCI. Pressing the RESET button causes the circuit interrupter contacts to close either mechanically or electro-mechanically. Via instructions included with the device and/or via device labels, users are instructed to test the GFCI periodically (typically every 30 days) and replace devices that fail. In reality, however, most people ignore the instructions to test the device on a regular basis, testing the device infrequently, if at all, even when visible instructions and warnings are placed on the GFCI itself.

Another factor lowering reliability of GFCIs, in addition to the failure of users to test the GFCI, include power outages and the corresponding surges in power when power is restored. Power restoration can cause huge spikes of voltage and current to appear on the power line, thus creating the possibility of component failure. Therefore, it would be desirable if the GFCI was able to detect power being restored after a sufficiently long power outage and, in response, to force the user to test the device. Required testing of the GFCI after it has tripped due to a ground fault would also be beneficial, due to the possibility of abnormal currents and voltages that may occur during this time.

Thus, there is a need for a GFCI that is capable of communicating to a user the occasions that the device must be tested. Upon testing, the device should indicate whether it has been miswired and/or whether any portion of its internal components is not operating correctly.

SUMMARY OF THE INVENTION

The present invention is a ground fault circuit interrupter device that incorporates an intelligent circuit, independent of the GFCI circuit portion of the device. The device is preferably implemented using a processor such as a microprocessor, microcontroller, controller circuitry embedded in an ASIC or other suitable device. It is important to note that since the intelligent circuit is separate and independent of the GFCI circuit portion, the intelligent circuit could be used with any circuit interrupting means that can be reset and which incorporates a test circuit. Examples of such circuit interrupting means suitable for use with the present invention include ground fault circuit interrupters (GFCIs), appliance leakage circuit interrupters (ALCIs), electrical leakage circuit interrupters (ELCI), resettable immersion detection circuit interrupters (IDCIs), arc fault circuit interrupters (AFCIs) or combination AFCI/GFCIs.

The invention provides a microcontroller enhanced GFCI (hereinafter referred to as an intelligent GFCI or IGFCI) that indicates to a user when the device must be manually tested. The test time events occur upon first installation and on a monthly basis thereafter. In addition, to further improve reliability, the device indicates that testing is required after occasions of power outage of sufficient time duration and after the device has been tripped by the occurrence of a ground fault. At the times when manual testing of the device is required, a visual and/or audible alarm is triggered and continues until a successful test and reset sequence is completed.

Further, the invention provides the ability to detect when the device is incorrectly wired in an electrical wiring system. Upon detection of a miswiring condition, a visual and/or audible alarm is triggered to alert the user to the miswired condition. The alarm cannot be disabled unless the miswiring condition is removed.

The invention also provides the ability to detect whether a BIT cycle has failed and in response thereto, to indicate this fact to a user via continuation of a visual and/or audible alarm.

The device of the present invention provides these features in a cost-effective manner, using a flexible system incorporating conventional microcontroller hardware. The intelligent portion of the IGFCI is independent from the ground fault circuitry portion, thus eliminating any possible interrelated reliability problems.

At times when manual testing of the device is required, the processor portion of the device produces a visual and/or audible indication that the device should be tested. These times include (1) when the device is first powered, or after a power outage of long enough time duration to reset the microcontroller (2) when a 30 day timer times out (3) after the device trips due to a ground fault and (4) when the test button is pressed (if the outputs are not already enabled).

At each stage of the manual test sequence, i.e., press test button, open contacts, close contacts on resetting device, the change in input is confirmed and the next flag in a sequence of flags is enabled. The enabling of a flag is dependent on the enabling of the previous flag. The subsequent audible and visual signal will not cease unless the last flag is enabled upon resetting of the GFCI. Thus, if the test fails or is not completed, the signal continues to be active, providing an indication that the test has failed. Upon completion of a valid manual test, the 30 day timer is started. When the 30 day timer times out, the audible and visual outputs are enabled once again, and the visual and audible alarms continue until a successful manual test is completed.

The IGFCI device comprises a novel power supply to provide the intelligent circuit with power even in the event the contacts are open and the device has been miswired. The principle of operation of the intelligent circuit is based on a so-called 'polled input' scheme, whereby the state of the circuit inputs are polled whenever the circuit receives a certain signal. Appropriate action is subsequently taken depending on the state of the inputs. The polled inputs are derived from the test circuit, line input and load input. The signal to poll the inputs is a negative edge on the test circuit input, which occurs once every AC cycle if the test button is not being pressed. The test, line side and load side inputs are tested a fixed time after the negative edge. Note that testing cannot occur at zero crossing since incorrect readings would result.

If no change in inputs is detected, the test signal negative edge is used to decrement a counter, which provides timing for the visual and audible outputs. If the visual and audible outputs are disabled, then the test signal negative edge is used to decrement a series of counters which implement a 30 day timer, i.e., 60×60×60×24×30 AC cycles. Note that it is recommended that a GFCI be tested every 30 days. The invention, however, is not limited to a 30-day timeout period. The timeout period can be set for any arbitrary time without departing from the spirit of the present invention.

The test signal is not used to decrement the counter when miswiring of the device is detected. When a miswiring condition is detected, the visual and audible outputs are enabled. However the sequence of blinking and beeping is not dependent upon the device detecting a negative edge on the test input. The blinking and beeping is timed using the oscillator that provides the clock for the microcontroller. Note that the test signal cannot be used during a miswiring situation since without power on the line neutral terminal and with the relay contacts and the test button open, no signal is present on the test input.

If a change in inputs is seen, then the change in input is verified over a number of AC cycles to filter out incorrect inputs. Incorrect inputs may occur due to factors such as noise and contact bounce. Once the change in inputs is verified, the intelligent circuit operates in accordance with the new state of the inputs and the previous state. The inputs include the test line and load signals which may be represented as a 3 bit binary number (test, load, line) with each bit having a value of '0' or '1' to indicate its corresponding state.

If the intelligent circuit confirms a change in input to (1, 1, 1), i.e., test, load and line, signals are one, then it is determined that the test button has been pressed. The first flag in the manual test flag sequence is set. The visual and audible outputs are enabled.

If a change in inputs to open relay contacts (0, 0, 1) is confirmed, following a test button press, the first flag in the flag sequence is reset and the second flag is set.

If a change in inputs to closed relay contacts (0, 1, 1) is confirmed and the second sequence flag is set, then a third flag is set and the second flag is removed.

The above sequence of events represents a valid manual test of the circuit interrupting device. The test button is pressed; the device trips and opens the contacts. The contacts are then closed upon the device being reset. Upon completion of a valid manual test, the generation of the third sequence flag causes the 30 day timer to be initiated and the visual and audible outputs to be disabled. If the correct sequence of the valid manual test is not followed, e.g., the device does not trip when the test button is pressed, or the device is not reset, then the visual and audible outputs continue.

If open contacts are confirmed (0, 0, 1), without the test button previously being pressed, then a ground fault is assumed to have occurred. The visual and audible outputs are enabled, indicating that a valid test sequence is required.

If the unit is miswired, the input state becomes (0, 1, 0) or (1, 1, 0) while the contacts are open. When this input state is verified, the visual and audible outputs are enabled using the instruction cycle of the microcontroller as a clock. In this case, the visual and audible outputs will continue indefinitely until power is removed from the device. Note that if power is reapplied then blinking and beeping are enabled at power on and the miswire blinking and beeping are enabled when the contacts are opened once again. The only way to stop the device from blinking and beeping is to wire it properly and perform a valid manual test sequence.

BRIEF DESCRIPTION OF THE DRAWINGS

The invention is herein described, by way of example only, with reference to the accompanying drawings, wherein.

DETAILED DESCRIPTION OF THE INVENTION

Figure 1:
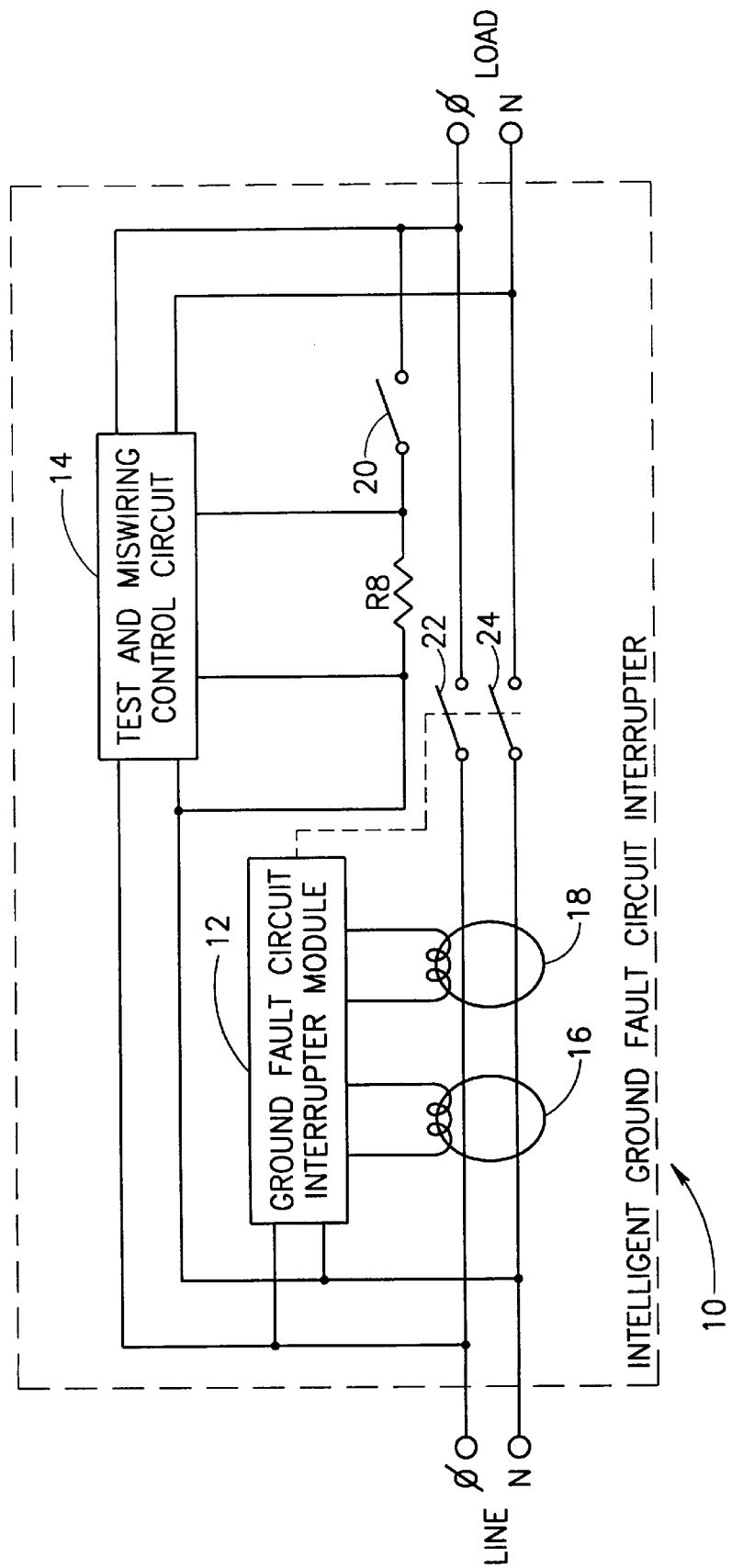
FIG. 1 is a schematic block diagram illustrating the GFCI circuit and test and miswiring control circuit portions of the IGFCI of the present invention.

A schematic block diagram illustrating the GFCI circuit and test and miswiring control circuit portions of the IGFCI of the present invention is shown in FIG. 1. The intelligent ground fault circuit interrupter (IGFCI), generally referenced 10, comprises load and line side phase and neutral terminals. The device is correctly wired into an electrical system by connecting the line side terminals to the phase and neutral wires supplying electrical power. The load side terminals are wired to downstream electrical devices.

The line phase and neutral wires pass through differential transformers 16, 18, whose windings are input to the GFCI module 12. The GFCI module 12 is a conventional ground fault detector functioning to detect ground faults and open relay contacts 22, 24 in response thereto. The test and miswiring control circuit 14 (also referred to as the intelligent circuit) is connected to the line and load side phase and neutral wires. A momentary test switch 20 is connected across load phase and line neutral. When the test button switch is closed, a voltage appears across resistor R8 which is sensed by the control circuit 14.

It is important to note that due to the independent nature of the intelligent circuit it could be used in conjunction with any type of resettable circuit interrupting device to prevent miswiring and to require testing of the device at regular intervals and after times of possible electrical stress to the device. Examples of circuit interrupting devices that can be used with the control circuit 14 include, but are not limited to, GFCI, AFCI, ELCI and IDCI devices. The present invention will be described within the context of a standard receptacle, i.e., wall outlet, GFCI.

Figure 2:
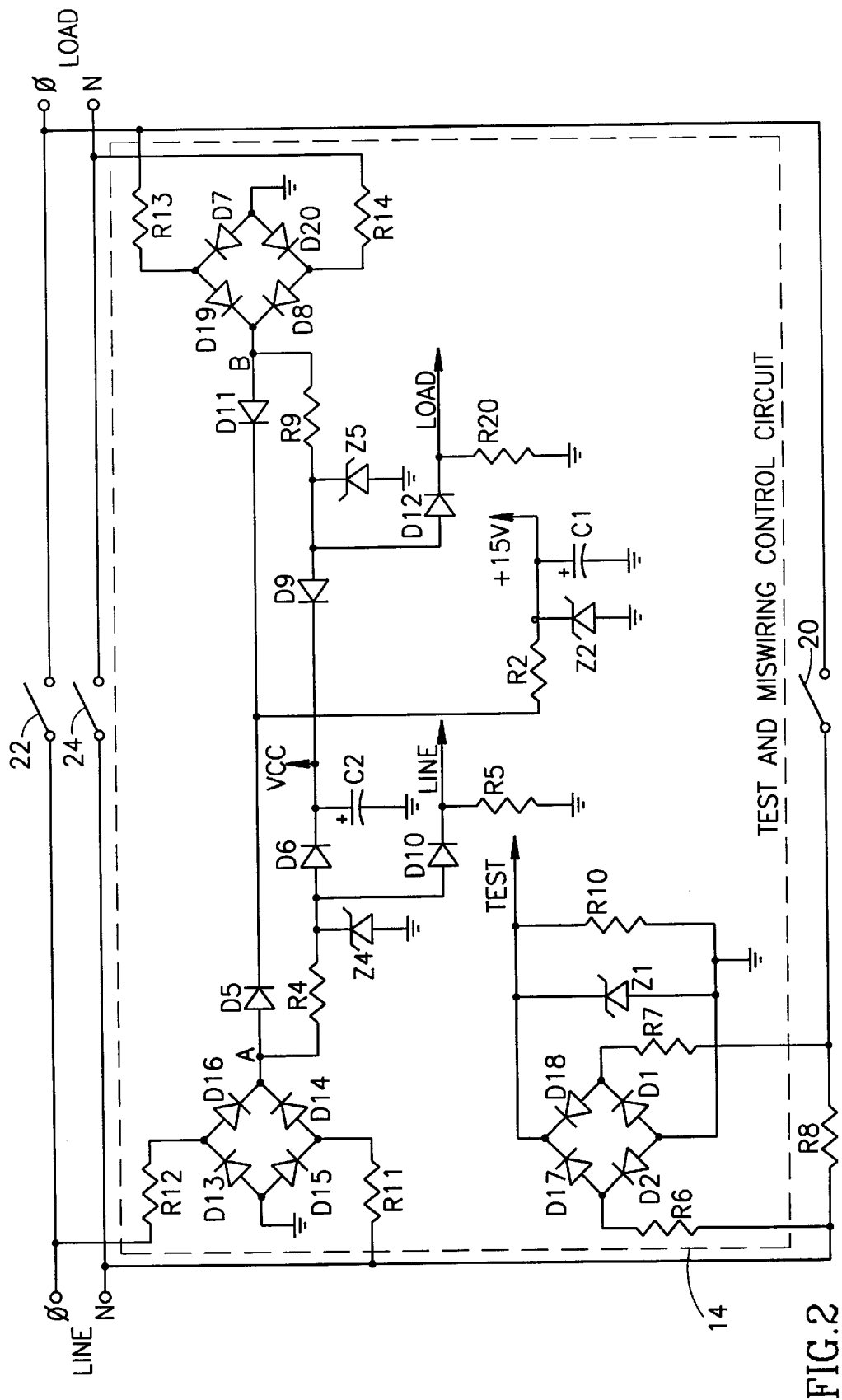
FIG. 2 is a schematic diagram illustrating the power supply circuitry and the circuitry responsible for the generation of the input signals to the test and miswiring control circuit.

A schematic diagram illustrating the power supply circuitry and the circuitry for generating the input signals to the test and miswiring control circuit 14 is shown in FIG. 2. The circuitry 14 generates input signals from the line side, load side and test button. Power to the device is derived from both the line and load sides of the electrical system. Thus, the device receives power regardless of whether the device is miswired and regardless of whether the relay contacts are open or closed.

Power from the AC line side is provided to the circuit through dropping resistors R12 and R11 and a bridge constructed from diodes D13, D14, D15 and D16. At the point labeled node A, the line side power supply splits. Diode D5 and resistor R2 provide a path for the full wave rectified potential at node A to charge capacitor C1. Capacitor C1 and zener diode Z2 create a 15 V DC supply to drive the visual and audible outputs of the intelligent GFCI. The visual and audible output devices are preferably pulsed at a low enough duty cycle so as to enable the trickle charging of capacitor C1 and the subsequent rapid discharge through the output device.

Diode D5 prevents the 15 V DC supply from being discharged through the line side power supply if the line side AC voltage is removed. Resistor R4 and zener diode Z4 drop the rectified voltage at node A to approximately 5.6 V. The smoothing capacitor C2 is charged from zener diode Z4 through diode D6, creating a 5 V DC supply to power the microcontroller. Diode D6 prevents capacitor C2 from being discharged through the power supply should the line side AC voltage be removed.

Power from the AC Load side is provided in a similar fashion. A full wave rectified voltage is produced at node B through voltage dropping resistors R13 and R14 and a bridge constructed from diodes D7, D8, D19 and D20. The voltage at node B charges the capacitor C1 through diode D11 and resistor R2. Diode D11 prevents the 15 V DC supply created across C1 and Z2 from being discharged through the load side power supply in the event the load side AC voltage is removed. Resistor R9 and zener diode Z5 drop the rectified voltage at node B to approximately 5.6 V. The smoothing capacitor C2 is charged through diode D9. Diode D9 prevents capacitor C2 from being discharged through the power supply when the load side AC voltage is removed.

The intelligent circuit is constructed so that it can operate when powered by the line side, load side or both. Preferably, resistors R11, R12, R13, R14, R2, R4 and R9 limit the current that can flow around the open relay contacts to approximately 0.5 mA or less.

In addition, to providing the two DC power supplies for the intelligent circuit, the line and load power supplies provide two input signals for the microcontroller. The LINE signal is created from the 5.6 V fully rectified AC voltage across zener Z4. An isolating diode D10 transfers the voltage across Z4, minus a diode drop, to the signal line designated LINE. A pull down resistor R5 ensures that the LINE signal is referenced to ground and that it is pulled to ground when no line voltage is present. Thus, the LINE input is a fully rectified 5 V signal when the line AC voltage is present. Ground potential is present when there is no line AC voltage present.

In a similar fashion, the LOAD signal is generated from the 5.6 V fully rectified voltage across zener diode Z5. Isolating diode D12 transfers the voltage across Z5, minus a diode drop, to a signal line designated LOAD. A pull down resistor R20 ensures that the LOAD signal is referenced to ground when no load voltage is present. Thus, the LOAD signal is a fully rectified 5 V signal when the load AC voltage is present and is ground potential when no load AC voltage is present.

Another input signal used by the processor is a signal labeled TEST, which indicates when the test button 20 is being pressed. The test circuit for a GFCI comprises one side of a resistor R8 connected to line neutral. The other side of resistor R8 is connected to one side of the normally open test switch 20. The other side of the test switch is connected to load phase. When a user closes the test switch, current flows from load phase to line neutral. This creates a differential current through the transformers in the GFCI module equal to the current flowing through resistor R8. Preferably, the value of resistor R8 is chosen to create a current flow slightly above the minimum level that will trip the GFCI.

A rectifying circuit, consisting of resistors R6 and R7 and diodes D1, D2, D17 and D18, is placed in parallel with resistor R8. The resistance of resistors R6 and R7 is relatively high so that the current flowing through the test circuit is not affected unduly. The fully rectified output of this rectifying circuit is connected to a zener diode Z1 to ground. The zener functions to limit the TEST output to 5 V. In addition, a pull down resistor R10 references the rectifier TEST signal to ground. Note that the ground of the device is floating in relation to the phase and neutral of the AC line. While the test switch is open, a half wave rectified signal is produced on the signal line TEST. When the test switch is pressed the full AC voltage is present across resistor R8 and the TEST signal is a full wave rectified signal.

Figure 3:
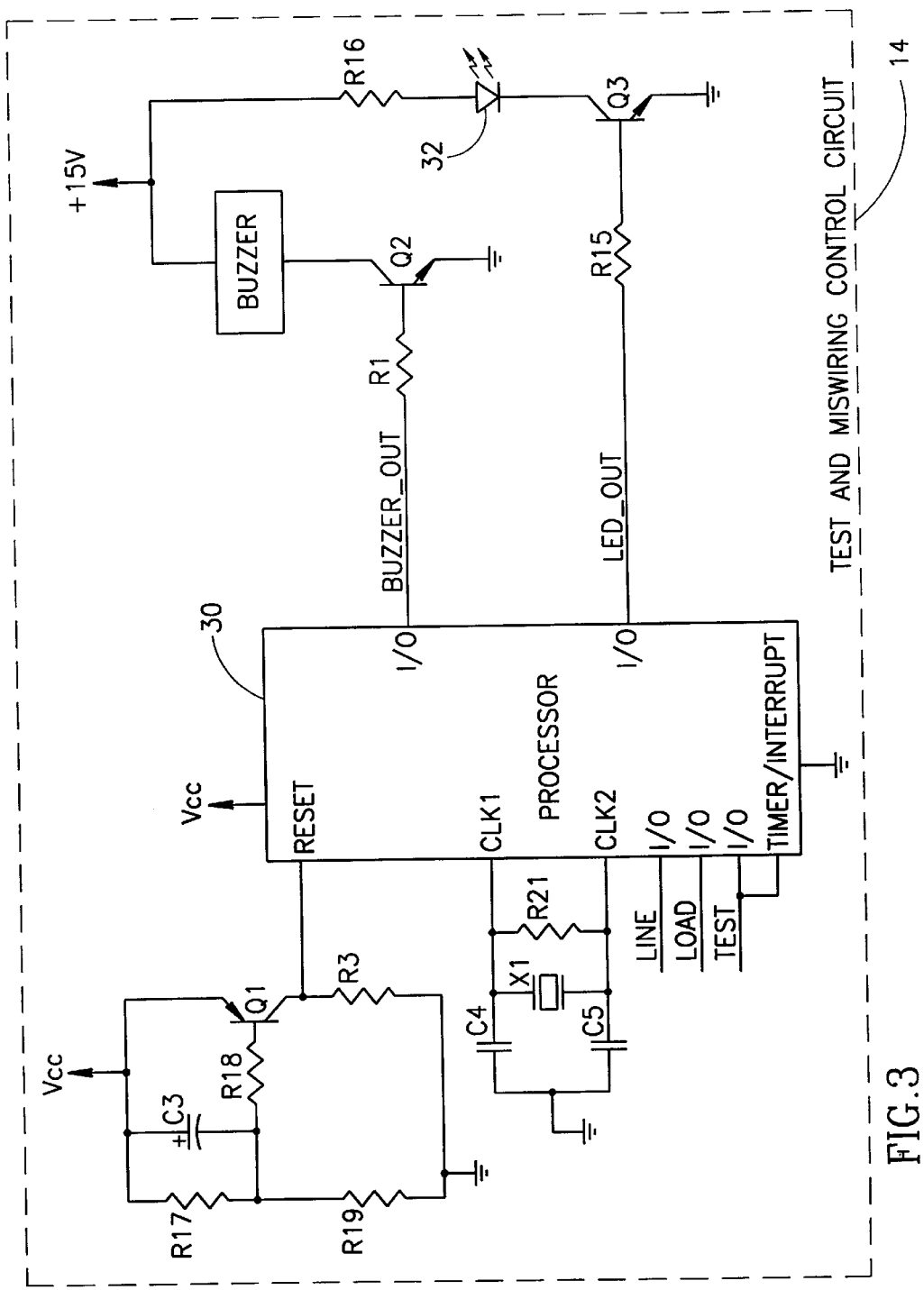
FIG. 3 is a schematic diagram illustrating the processor and output indicator circuitry portion of the test and miswiring control circuit.

A schematic diagram illustrating the processor and output indicator circuitry portion of the test and miswiring control circuit is shown in FIG. 3. The processor 30 comprises any suitable processor such as the COP8 microcontroller series from National Semiconductor. Other microcontrollers or microprocessors can also be used. The processor 30 is powered from the 5 V DC produced by the power supply circuitry described in connection with FIG. 2.

A power on reset circuit is connected to the processor and is constructed from PNP transistor Q1, resistors R3, R17, R18 and R19 and capacitor C3. When power is first applied, the reset circuit ensures that the RESET pin of the processor is held low until the power supply charges to close to 5 V. In addition, if there is a momentary loss of power, the power on reset circuit pulls the RESET pin low if the voltage supplied to the processor falls too low, thus resetting the processor. The reset circuitry prevents a low voltage on the power supply from erasing the volatile memory within the processor without it being RESET.

The speed of the processor instruction cycle is determined by the clock circuit used to drive the processor. The clock circuit comprises crystal X1, resistor R21 and capacitors C4 and C5. The oscillating frequency of the crystal X1 must be relatively low, in the order of hundreds of KHz, for the processor circuit to operate with less than 0.5 mA power consumption.

The three input signals LINE, LOAD and TEST are connected to three input port pins of the processor. The TEST input is also connected to a timer/interrupt input pin so that the processor can detect a negative edge on the TEST signal.

Optionally, a fourth input, called FACTORY_TEST, can be made available to the processor. This input is ignored by the processor except during a short period immediately after power up. If the FACTORY_TEST pin is held to $V_{DD}$ at this time, the processor executes a subroutine which tests all the functions of the processor software. In this way, the intelligent circuit can be tested in the factory after all the components have been soldered onto a PC board. The FACTORY_TEST input cannot be accessed by a user of the IGFCI device as it is enclosed in the device. It is for production quality purposes only.

The processor generates two outputs: LED_OUT and BUZZER_OUT. The LED_OUT output drives the base of NPN transistor Q3 through resistor R15. The transistor drives an LED 32 pulled to the 15 V supply via resistor R16 which limits the current to the LED. The BUZZER_OUT output drives the base of NPN transistor Q2 through resistor R1. When BUZZER_OUT is active, it resembles a square wave having a frequency of approximately 3 to 4 KHz. When the BUZZER_OUT signal is off, it is tied to ground potential. When the BUZZER_OUT signal is active, transistor Q2 drives a piezo buzzer at approximately 3 to 4 KHz. The piezo buzzer and the LED derive their current from the 15 V DC power supply so that they do not pull down the voltage supply to the processor.

When visual and audible outputs are required, the LED and piezo buzzer may be driven as follows below. Note that any manner of driving the visual and audible indictors is contemplated by the present invention.

1. Both outputs off for 1.4 seconds
2. LED on for 0.1 seconds
3. Both outputs off for 1.4 seconds
4. Piezo buzzer on for 0.1 seconds
5. Go back to step 1

Driving the visual and audible outputs in this fashion permits the capacitor C1 (FIG. 2), part of the 15 V DC power supply, to charge up between the alternating outputs. This allows the circuit to consume only 0.5 mA.

As an alternative to generating the approximately 3 to 4 KHz signal on one of the processor output pins using software, the output signal from the processor could be a steady 5 V when on, and ground potential when off. In this embodiment, the processor output would be used to drive an oscillator circuit, which may be constructed from a few CMOS gates, resistors and a small capacitor, or to drive a piezo with an internal oscillator.

Figure 4:
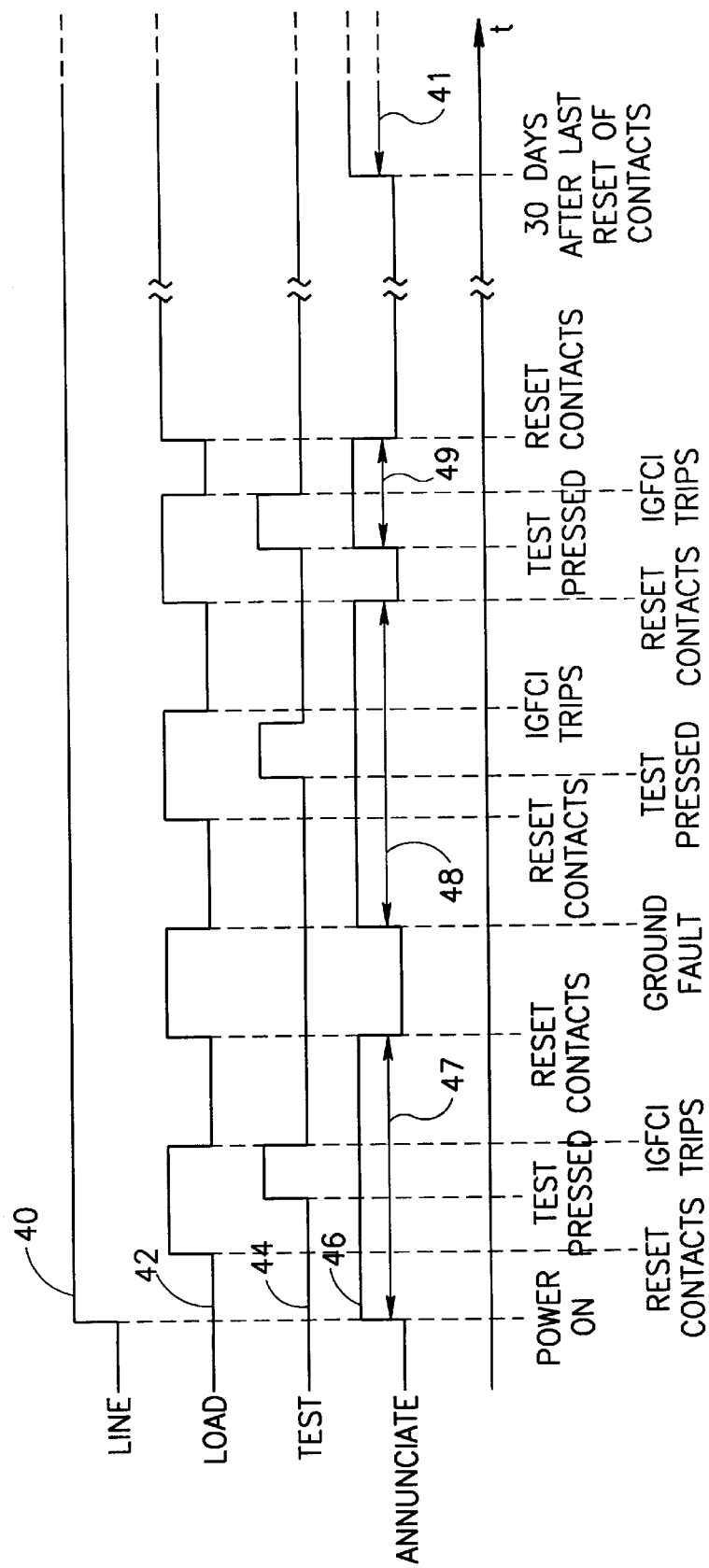
FIG. 4 is a timing diagram illustrating the input and output signals present during normal operating conditions of the IGFCI.

A timing diagram illustrating the LINE (trace 40), LOAD (trace 42), TEST (trace 44) and ANNUNCIATE (trace 46) signals present during normal operating conditions of the IGFCI is shown in FIG. 4. To aid in understanding the timing diagram, all input signals are shown as logic high (5 V) when on and logic low (ground potential) when off. As described previously, the LINE and LOAD inputs are generated from a full wave rectified signal. The TEST input is a half wave signal when the button is not pressed, i.e., off, and a full wave rectified signal when pressed, i.e., on. The output labeled ANNUNCIATE represents the two outputs LED_OUT and BUZZER_OUT which are pulsed alternately as described hereinabove.

When power is first applied, the LINE signal goes high but the LOAD signal is low, this indicates that the contacts are open. The contacts must be closed before a test and reset can be performed. The time period 47 of the ANNUNCIATE signal represents the necessity of a user to test and reset the device immediately after power up. The ANNUNCIATE signal goes low only after the user presses the test button and subsequently resets the device. The second time period 48 represents the necessity of a user to test the device following the occurrence of a ground fault. Note that although the test button was pressed, it was released a few milliseconds before the IGFCI tripped. This open contact state of the test button, however, is too short to be verified and is thus ignored by the processor. The third time period 49 represents an unscheduled test. The time period 41 represents the requirement of a user to test the device after a 30-day period as elapsed since the last resetting of the contacts.

Figure 5:
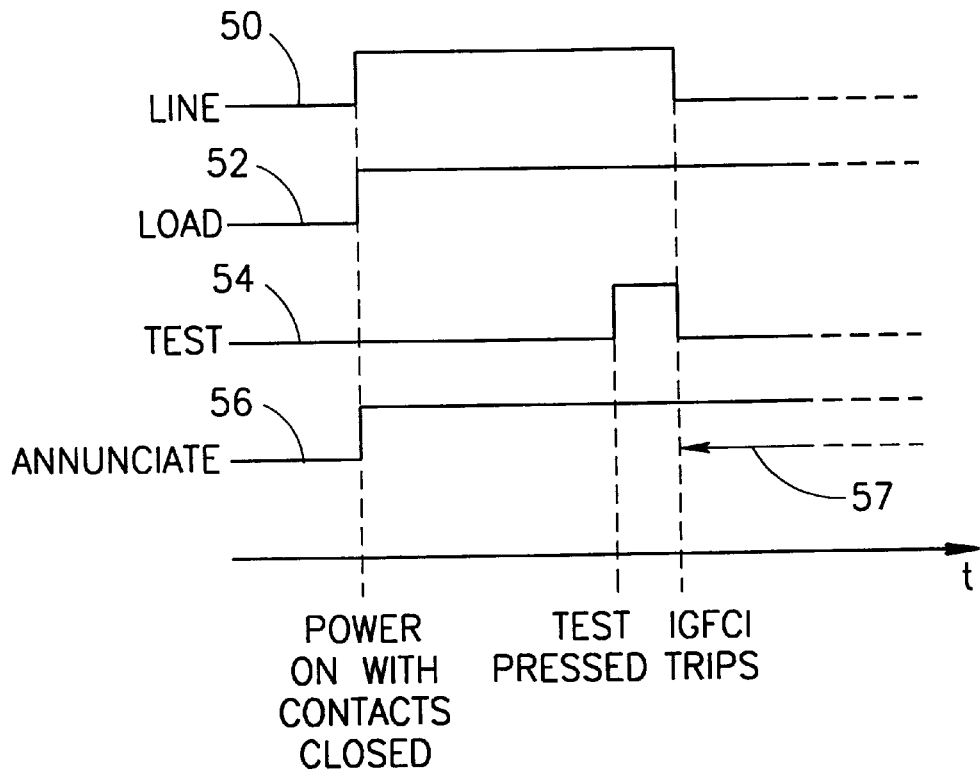
FIG. 5 is a timing diagram illustrating the input and output signals present during a miswiring condition.

A timing diagram illustrating the LINE (trace 50), LOAD (trace 52), TEST (trace 54) and ANNUNCIATE (trace 56) signals present during a miswiring condition is shown in FIG. 5. When power first applied, the annunciate signals, i.e., blink and beep, are active indicating the requirement to test the device at power up. At some point, the user presses the test button and the IGFCI immediately trips. Unlike in FIG. 4, the LOAD signal remains high, since the device is miswired and electrical power is input to the load side rather than to the line side of the device. From this point on, as represented by time period 57, the blink and beep of the device cannot be stopped. The only way to remove the annunciate signals is to remove power from the device and correct the miswiring condition.

Figure 6:
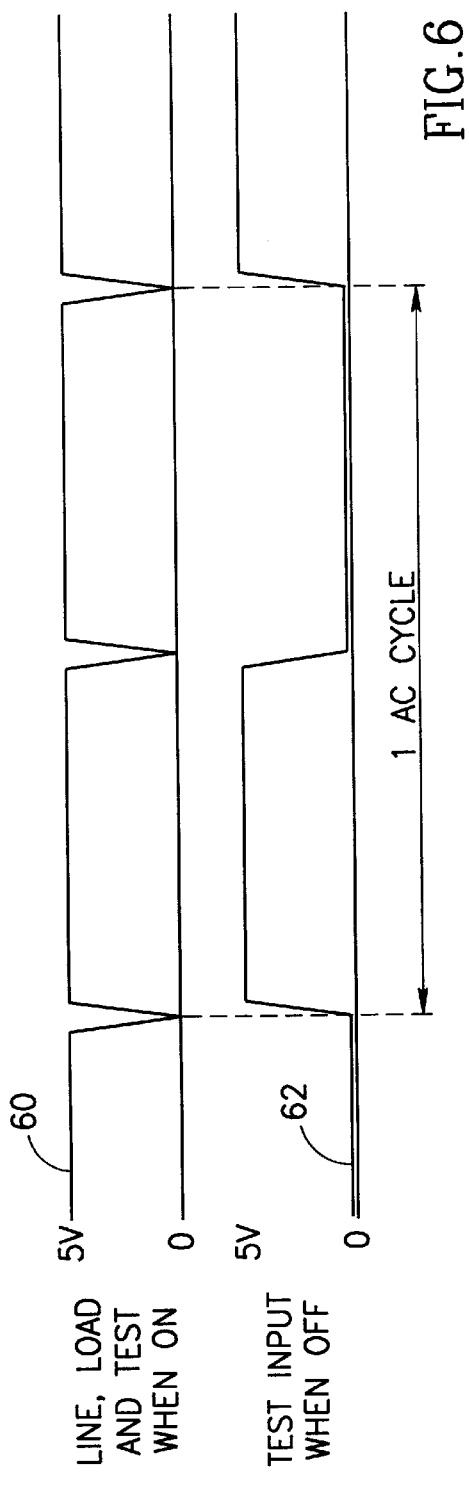
FIG. 6 is a timing diagram illustrating the input signals present during on and off states.

A timing diagram illustrating the input signals present during on and off states of the LINE, LOAD AND TEST signals is shown in FIG. 6. As described previously, the LINE, LOAD and TEST signals are full wave rectified while they are on (trace 60). The TEST signal is half wave rectified when the test button is off (trace 62). LINE and LOAD are zero when off.

Figure 7:
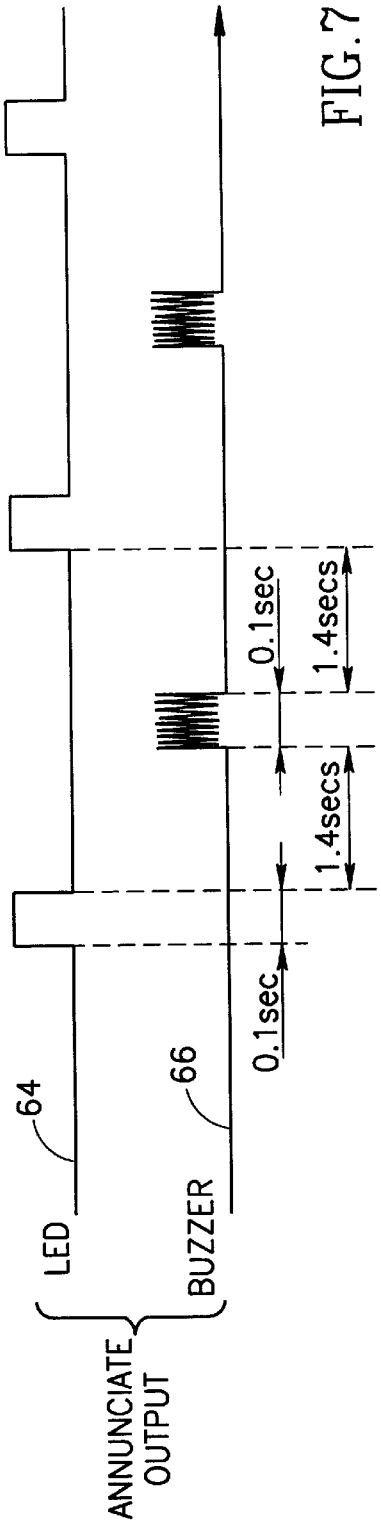
FIG. 7 is a timing diagram illustrating the annunciate output signals when active.

A timing diagram illustrating the annunciate output signals: LED (trace 64) and BUZZER (trace 66), when both are active is shown in FIG. 7. As described previously, both the visual and audible indicators are pulsed on and off in alternative fashion. Other types of indicators may also be used with different activation timing characteristics.

Figure 8:
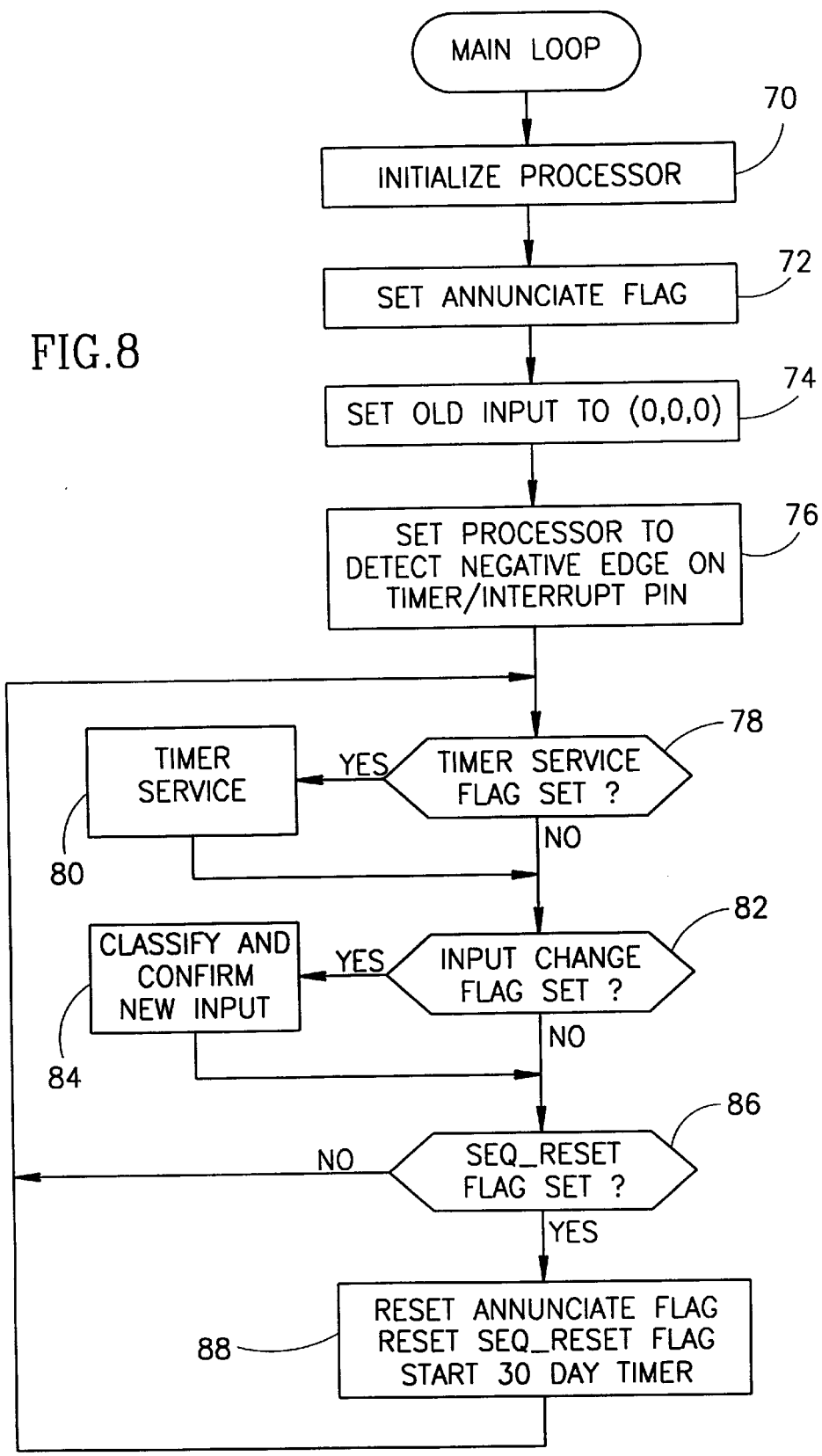
FIG. 8 is a flow diagram illustrating the main software routine of the IGFCI device.

The functionality provided by the software executed by the processor will now be described with reference to FIGS. 8 through 12B. A flow diagram illustrating the main software routine of the IGFCI device is shown in FIG. 8. First, the processor is initialized (step 70) followed by setting the ANNUNCIATE flag (step 72). Optionally, the factory test input can be checked at this point, if provided for by the processor circuit. If set, a factory test can be performed.

Next, the variable OLD_INPUT is set to (0, 0, 0), wherein the 3 bit binary number represents (TEST, LOAD, LINE) (step 74). The microcontroller is then set to detect a negative edge on its timer/interrupt pin (step 76). When a negative edge is detected on this pin, an interrupt occurs as detailed in FIG. 9. From this point on the software enters a loop. When the timer service flag is set (step 78) the timer service routine is executed (step 80). After the timer service flag is checked, the INPUT_CHANGE flag is checked (step 82). If set, the new input is classified and confirmed (step 84). Next, the SEQ_RESET flag is checked (step 86). If this flag is set, the ANNUNCIATE and SEQ_RESET flags are reset and the 30 day timer is started (step 88).

Figure 9:
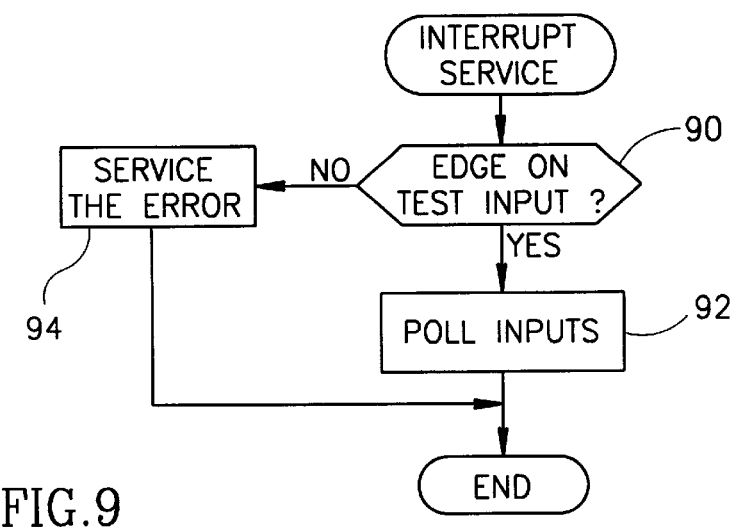
FIG. 9 is a flow diagram illustrating the interrupt service routine of the IGFCI device.

A flow diagram illustrating the interrupt service routine of the IGFCI device is shown in FIG. 9. When an interrupt occurs, it is checked whether the interrupt was triggered by a negative edge occurring on the TEST input signal (step 90). If so, the input signals are polled (step 92). If not, an error has occurred and an error service routine handles the error (step 94).

Figure 10:
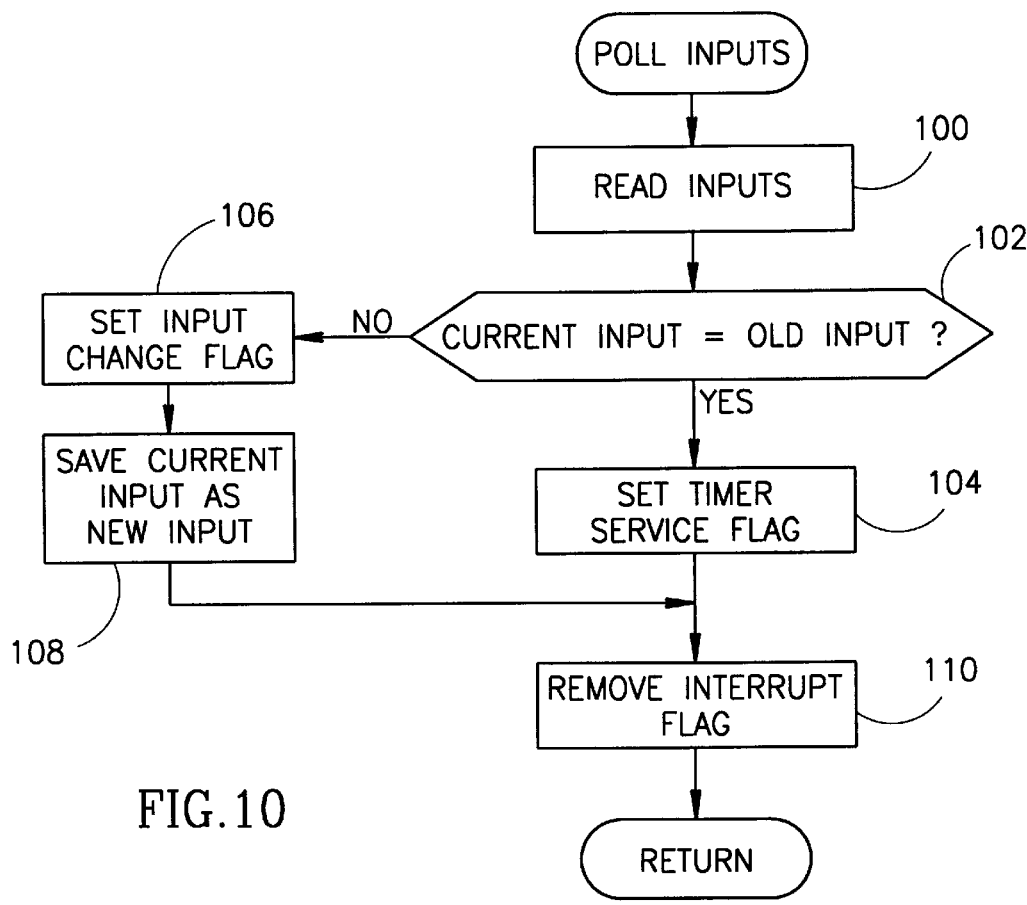
FIG. 10 is a flow diagram illustrating the input polling routine of the IGFCI device.

A flow diagram illustrating the input polling routine (step 92) of the IGFCI device is shown in FIG. 10. The first step is to read the input signals through the processor I/O port (step 100). If the current 3 bit input is the same as the 3 bit input recorded as OLD_INPUT (step 102), the timer service flag is set (step 104). If they are not the same, the INPUT_ CHANGE flag is set (step 106) and the current input is stored as a variable called NEW_INPUT (step 108). The interrupt flag is then removed (step 110).

The processor is preferably programmed to ignore any negative edge interrupts that occur during execution of a subroutine. Exceptions to this rule include (1) the timer service subroutine and (2) the servicing of the blinking and beeping. If the piezo buzzer drive signal is generated within the processor then the program is halted in this loop of the subroutine for the time that the buzzer is on, approximately 0.1 seconds. This amount of time is too long to neglect the checking for new inputs. Thus, the program should be permitted to interrupt within this portion of the program.

It is important not to permit interrupts during execution of the classify and confirm new input subroutine as the verify process should not be interrupted. Any interrupt flag, which is latched on during a subroutine where interrupts are ignored, is removed before the processor is set to detect negative edges again. Otherwise, an interrupt would occur as soon as the program comes out of the subroutine which is not necessarily a negative edge of the test input, thus yielding possibly erroneous inputs.

The verify software sequences test the appropriate input for a specified time every eighteen instruction cycles. A successful verify occurs if the appropriate input is present more than the specified number of times or is present for less than the specified number of times. Table 1 below summarizes the criteria for verification of the various input signals.

TABLE 1

| Test | Number of Tests | Condition for Verification |
|---|---|---|
| Test Button Press | 32 | Test input is high more than 20 tests out of 32. |
| Open Contacts | 32 | Load input is high for less than 6 tests out of 32. |
| Closed Contacts | 32 | Load input is high more than 20 tests out of 32. |
| Reverse Wiring | 32 | Line input is high for less than 6 tests out of 32. |

Figure 11:
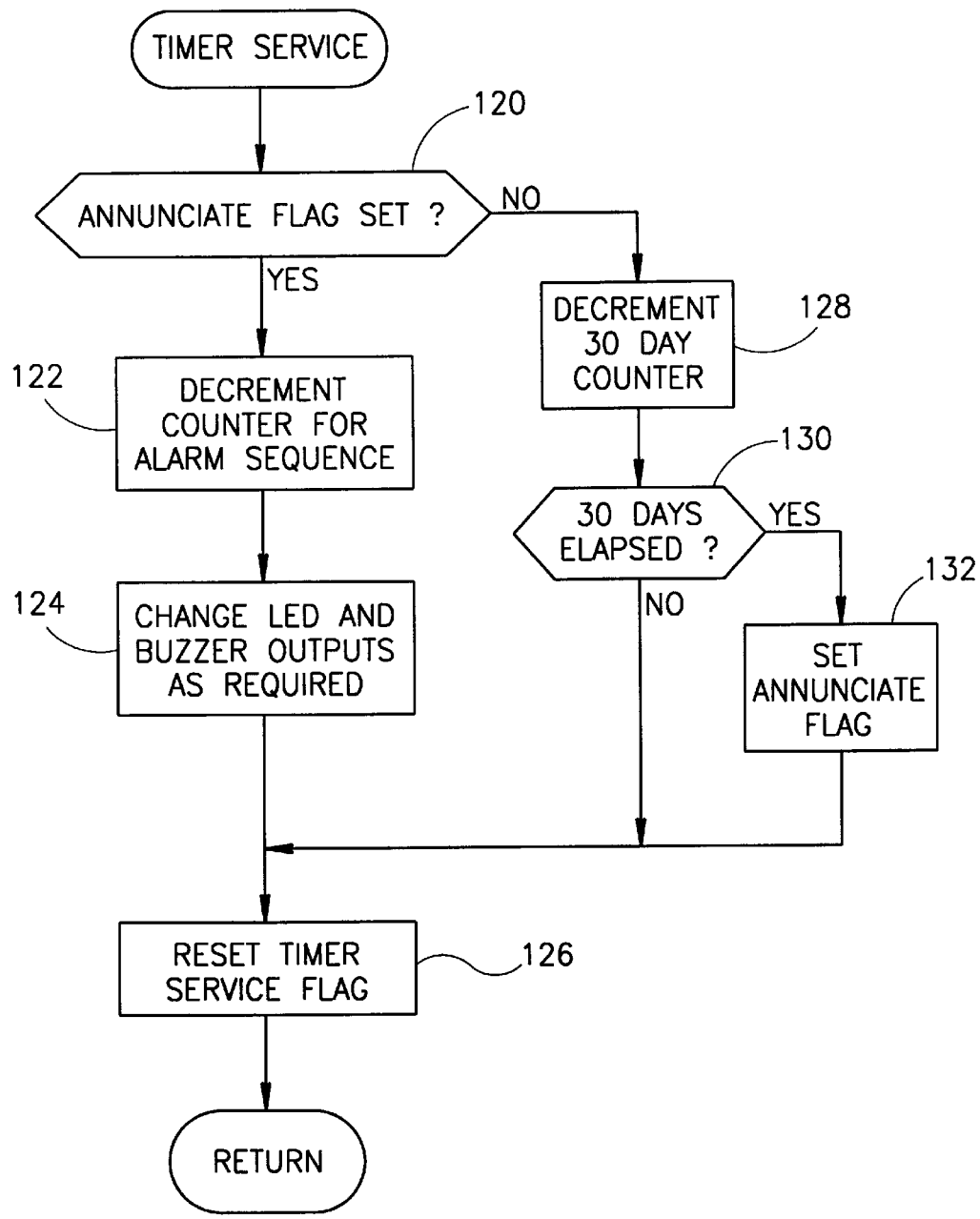
FIG. 11 is a flow diagram illustrating the timer service routine of the IGFCI device.

A flow diagram illustrating the timer service routine of the IGFCI device is shown in FIG. 11. This routine is entered when the timer service flag is set (step 78). First, the ANNUNCIATE flag is checked (step 120). If it is set, the alarm sequence counter is decremented (step 122) and the LED and buzzer output signals are changed as needed, i.e., to create the blinking and beeping (step 124). If the flag is not set, the 30-day counter is decremented (step 128). If 30 days have elapsed (step 130), the ANNUNCIATE flag is set (step 132). Before exiting, the timer service flag is reset (step 126).

Figure 12A:
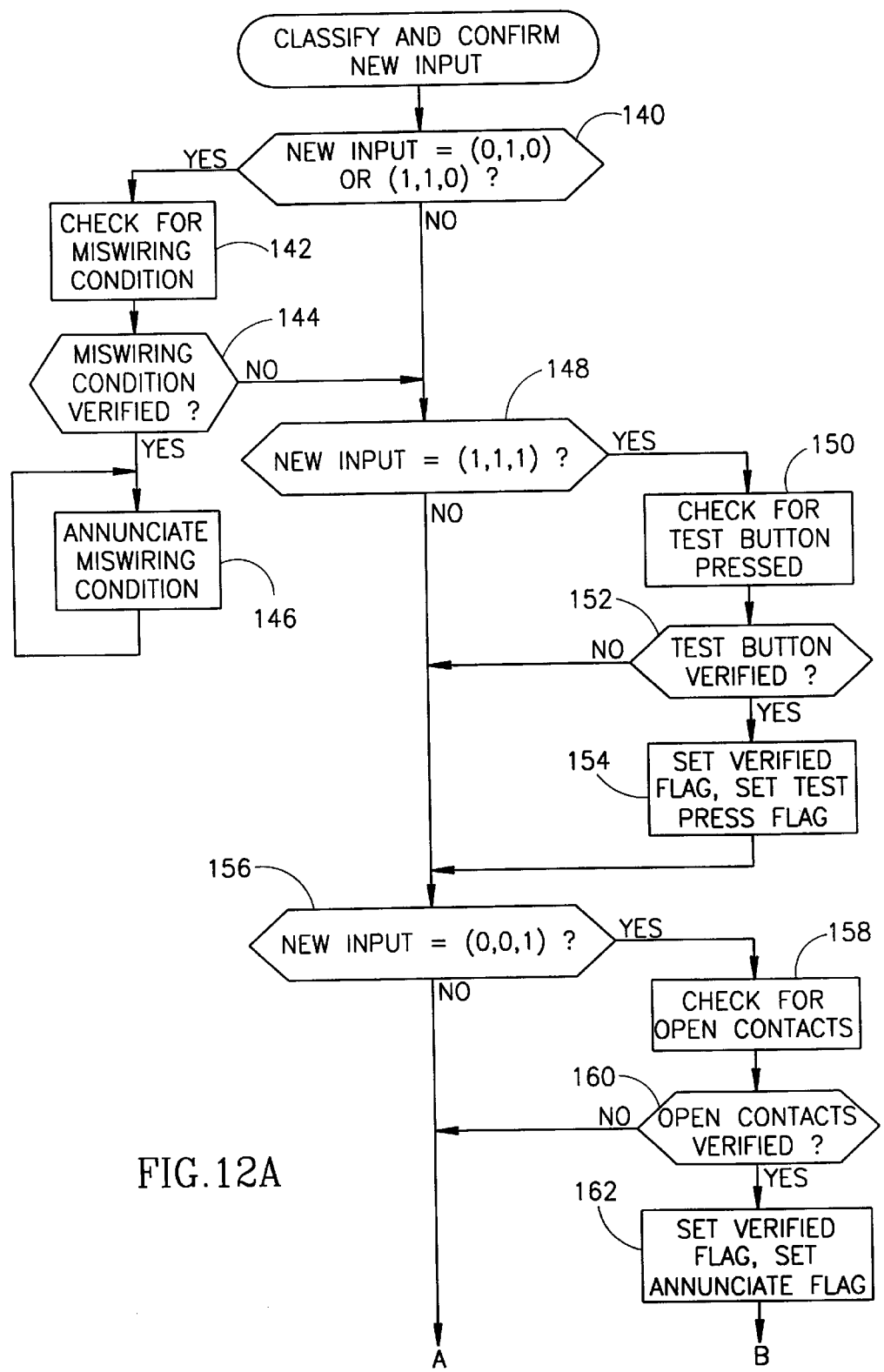
FIGS. 12A and 12B are flow diagrams illustrating the routine for classifying and confirming new inputs.
Figure 12B:
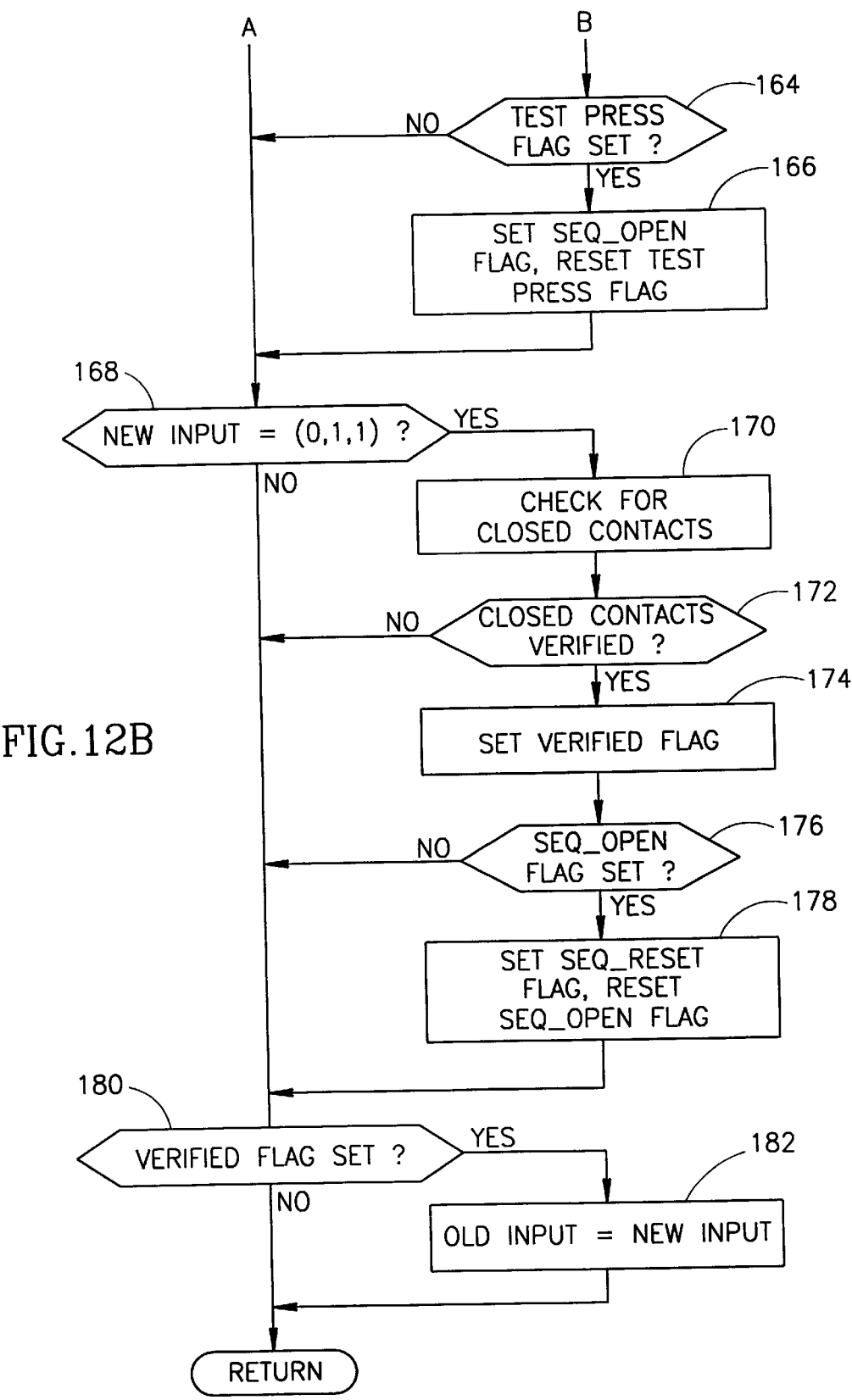

Flow diagrams illustrating the routine for classifying and confirming new inputs are shown in FIGS. 12A and 12B. First it is checked whether the variable NEW_INPUT equals (0, 1, 0) or (1, 1, 0), i.e., line/load reversal condition (step 140). If so, the device verifies whether a miswiring condition actually exists by sampling the inputs multiple times (step 142). If it is determined that a miswiring condition exists (step 144) then the visual and audible indicators are annunciated in an infinite loop and cannot be stopped other than by removing electrical power from the device (step 146).

If a miswiring condition is not determined, the device checks if the variable NEW_INPUT equals (1, 1, 1) (step 148). If so, a test button press is checked for (step 150). If the test button press is verified (step 152), the VERIFIED and TEST PRESS flags are set (step 154). If the test button press is not verified, the input is checked if it equals (0, 0, 1), i.e., open contacts (step 156). If so, it is then checked whether the contacts are open (step 158). If the open contacts are verified (step 160) the VERIFIED and ANNUNCIATE flags are set ( step 162). It is then checked whether the test press flag is set (step 164). If so, the SEQ_OPEN flag is s et and the test press flag is reset (step 166).

The routine then continues with checking whether the variable NEW_INPUT equals (0, 1, 1) (step 168). If so, the device checks for closed contacts (step 170). If the closed contacts are verified (step 172), the VERIFIED flag is set (step 174). It is then checked whether the SEQ_OPEN flag is set (step 176). If so, the SEQ_RESET flag is set and the SEQ_OPEN flag is reset (step 178).

Before the routine returns, it is checked whether the VERIFIED flag is set (step 180). If so, the variable OLD_INPUT is set to the same value as the variable NEW_INPUT (step 182) and the subroutine returns.

The tests present in the flow diagrams in FIGS. 8 through 12B can also be utilized to produce outputs for communication to a central point thus providing remote annunciation. The following Table 2 summarizes the various states and the resultant remote signal.

TABLE 2

| State of Inputs, Flags and Registers | Remote Signal |
| --- | --- |
| Annunciate Flag = 1 Confirmed Open Contacts | Annunciate |
| Test Press Flag = 0 | Ground Fault |
| Test Press Flag = 1 | Pressed Test Button |
| Seq_Open Flag = 1 | Open after Pressed Test Button |
| Seq_Reset Flag = 1 | Successful Manual Test |
| 30 Day Counter Decremented to Zero | 30 Days Have Elapsed |
| Confirmed Reverse Wiring | Reverse Wiring |
| Annunciate, Test Press, Seq_Open Flag and Seq_Reset Flag = 0 Confirmed Closed Contacts | Normal Operation |

Note that the annunciate remote signal provides the simplest form of remote annunciation. It notifies the user that the IGFCI is blinking and beeping and that further investigation is needed. In addition, the reverse wiring annunciation is preferably generated by a different portion of the code than the normal annunciation, as the negative edge of the test signal cannot be relied upon for timing. Thus, the reverse wiring annunciation can be different if desired.

In addition, it may not be desirable to annunciate the Pressed Test Button since the timing between the button being pressed and the subsequent opening of the contacts is very close, e.g., less than 0.3 sec. If a signal is sent, sufficient time to test the open contacts may not be available.

While the invention has been described with respect to a limited number of embodiments, it will be appreciated that many variations, modifications and other applications of the invention may be made.

What is claimed is:

1. The method of determining the status of an intelligent circuit interrupting device, comprising the steps of:
    a) producing a first signal indicative of the status of a test button;
    b) producing a second signal indicative of the status of a line line;
    c) producing a third signal indicative of the status of a load line; and
    d) sampling periodically one of said first, second and third signals and based upon such sampling indicating the status of an intelligent circuit interrupting device.

2. The method as defined in claim 1, wherein said first signal can indicate that contacts of said test button are open or closed.

3. The method, as defined in claim 1, wherein said first signal can be of a first potential to indicate that the contacts of said test button are open or of a second potential to indicate that contacts of said test button are closed.

4. The method, as defined in claim 3, wherein
    a) said second signal can be of said first potential or of said second potential; and
    b) said third signal can be of said first potential or of said second potential.

5. The method, as defined in claim 1, wherein said sampling of said first, second and third signals is performed on the negative edge of every complete cycle of a 60 HzAC cycle of a test input.

6. The method, as defined in claim 4, wherein said sampling of said first, second and third signals is performed on the negative edge of every complete cycle of a 60 HzAC cycle of a test input.

7. The method, as defined in claim 4, wherein any change in a potential of said first, second or third signals is verified over a number of 60 HzAC cycles before new first, second or third signals are used to determine the status of an intelligent circuit interrupting device.

8. The method, as defined in claim 6, wherein any change in a potential of said first, second or third signals is verified over a number of 60 HzAC cycles before new first, second or third signals are used to determine the status of an intelligent circuit interrupting device.

9. The method, as defined in claim 4, wherein when said first, second and third signals are at said second potential they indicate that said test button of said intelligent circuit interrupting device has been pushed to close its contacts.

10. The method, as defined in claim 9, wherein said first signal must be at said second potential in more than 20 samples out of 32 test cycles to verify that said test button contacts are closed.

11. The method, as defined in claim 4, wherein when said first and second signals are at said first potential and said third signal is at said second potential they indicate that relay contacts of said intelligent circuit interrupting device are open.

12. The method, as defined in claim 11, wherein said third signal must be at said second potential for less than 6 samples out of 32 test cycles to verify that said relay contacts are open.

13. The method, as defined in claim 7, wherein when said first signal is at said first potential and said second and third signals are at said second potential they indicate that relay contacts of said intelligent circuit interrupting device are closed.

14. The method, as defined in claim 13, wherein said third signal must be at said second potential for more than 20 samples out of 32 test cycles to verify that said relay contacts are closed.

15. The method, as defined in claim 7, wherein when said first and third signals are at said first potential and said second signal is at said second potential they indicate that said relay contacts of said intelligent circuit interrupter device are open and said device is miswired with respect to a line and a load to which it is coupled.

16. The method, as defined in claim 15, wherein second signal must be at said second potential for less than 6 samples out of 32 test cycles to verify that said relay contacts are open and said device is miswired.

17. The method, as defined in claim 7, wherein when said first and second signals are at said second potential and said third signal is at said first potential they indicate that relay contacts of said intelligent circuit interrupter device are open and said device is miswired with respect to a line and a load to which it is coupled.

18. The method, as defined in claim 17, wherein said second signal must be at said second potential for less than 6 samples out of 32 test cycles to verify that said relay contacts are open and said device is miswired.

* * * * *